United States Patent [19]

Herrmann

[11] 4,143,257
[45] Mar. 6, 1979

[54] WELDING WIRE FEED MECHANISM

[75] Inventor: Karl H. F. W. Herrmann, Edmonds, Wash.

[73] Assignee: Nova-Tech Engineering, Inc., Edmonds, Wash.

[21] Appl. No.: 673,353

[22] Filed: Apr. 2, 1976

[51] Int. Cl.² ............................................. B23K 9/02
[52] U.S. Cl. .................................. 219/60 A; 219/74; 219/125.1; 219/137.2; 219/158; 228/41
[58] Field of Search ...................... 219/60 A, 130, 136, 219/161, 74, 158, 131 F, 137.2, 125.1; 228/41

[56] References Cited

U.S. PATENT DOCUMENTS

| | | | |
|---|---|---|---|
| 1,048,915 | 12/1912 | Thompson | 219/161 |
| 1,363,933 | 12/1920 | Trimble | 219/158 X |
| 3,299,245 | 1/1967 | Tinnes | 219/60 A |
| 3,344,305 | 9/1967 | Ogden | 219/130 |
| 3,461,265 | 8/1969 | Spiro | 219/60 A |
| 3,509,314 | 4/1970 | Freytag | 219/130 X |
| 3,688,070 | 8/1972 | Smith | 219/60 A |
| 3,876,852 | 4/1975 | Topham | 219/74 X |
| 3,944,781 | 3/1976 | Urbanic | 219/74 X |
| 4,005,308 | 1/1977 | Chaney | 219/131 F |

FOREIGN PATENT DOCUMENTS 398646  9/1933  United Kingdom ................ 219/131 F

*Primary Examiner*—E. A. Goldberg
*Attorney, Agent, or Firm*—Robert W. Beach; Ward Brown

[57] ABSTRACT

Workpieces to be joined by welding are held in juxtaposition to provide a joint location to which welding wire is to be fed. The welding wire is fed to the joint location from a passage in a welding wire feeder that is guided for movement relative to the workpieces and the joint location. As the welding wire feeder is moved relative to the joint location, welding wire passes from a groove in the feeder through an arcuate passage directed toward the joint location. During welding the feeder is moved relative to the workpieces along the weld line. The welding wire is melted at the joint location by being heated, such as by connecting a workpiece and the welding wire feeder to an electric circuit for producing a welding arc between the welding wire and the workpieces at the joint location.

12 Claims, 9 Drawing Figures

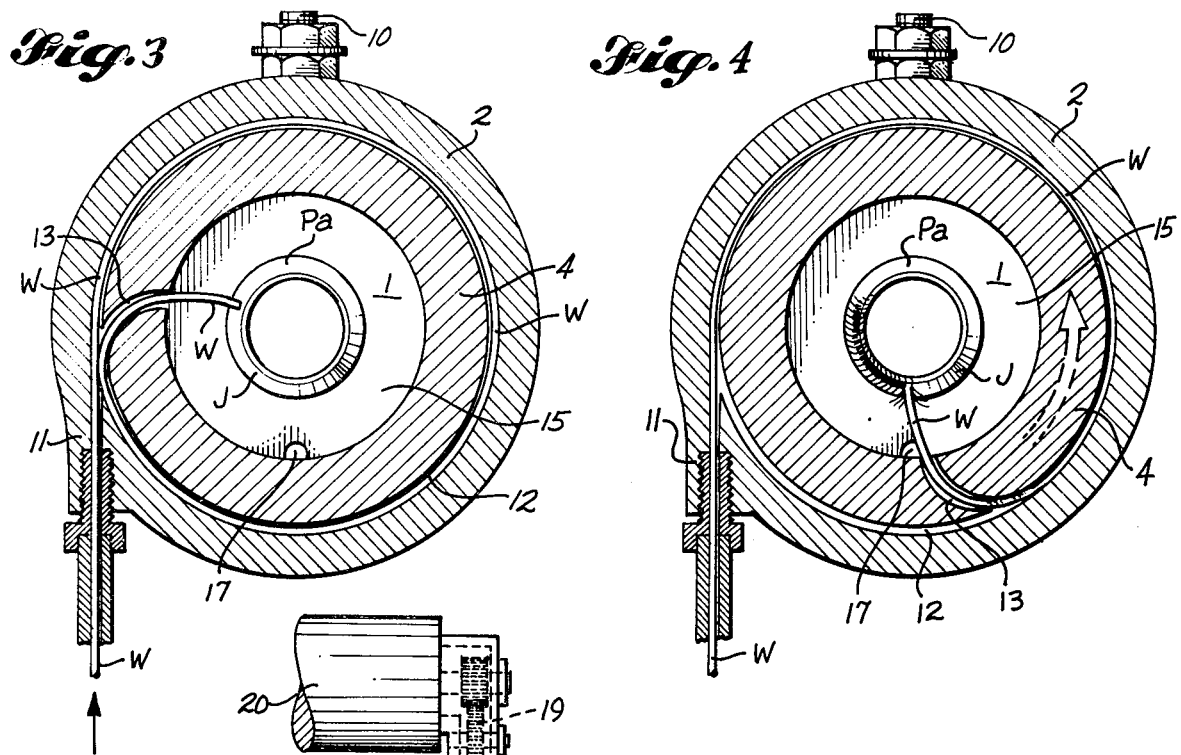
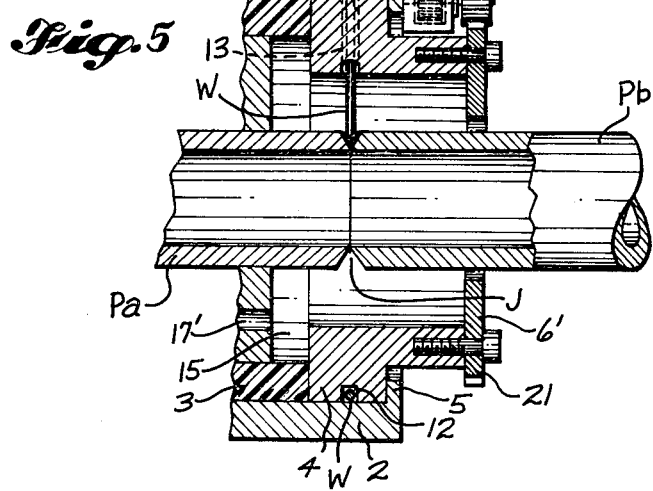
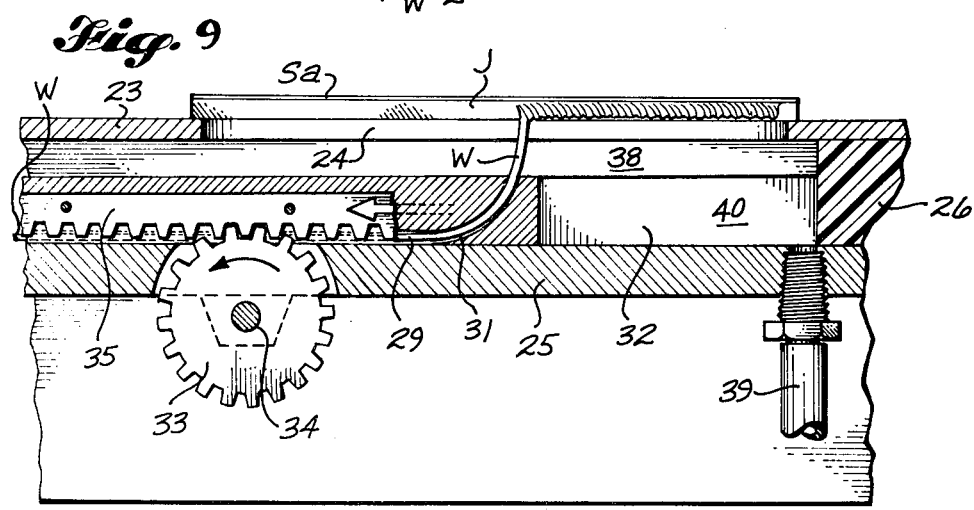

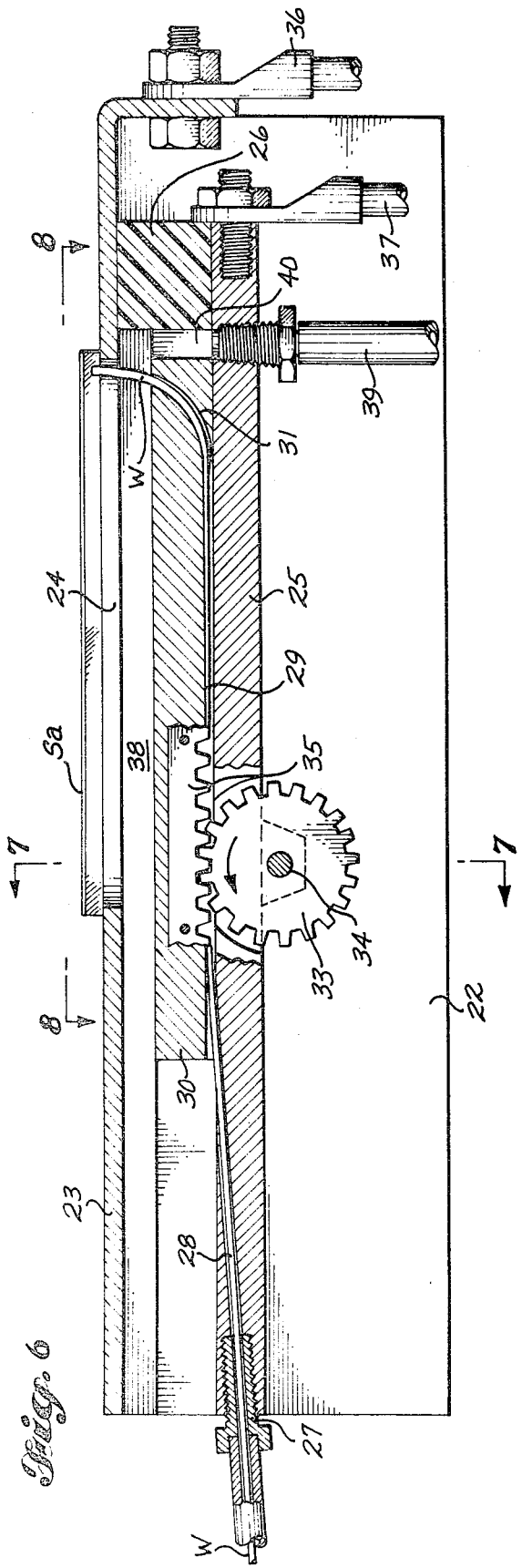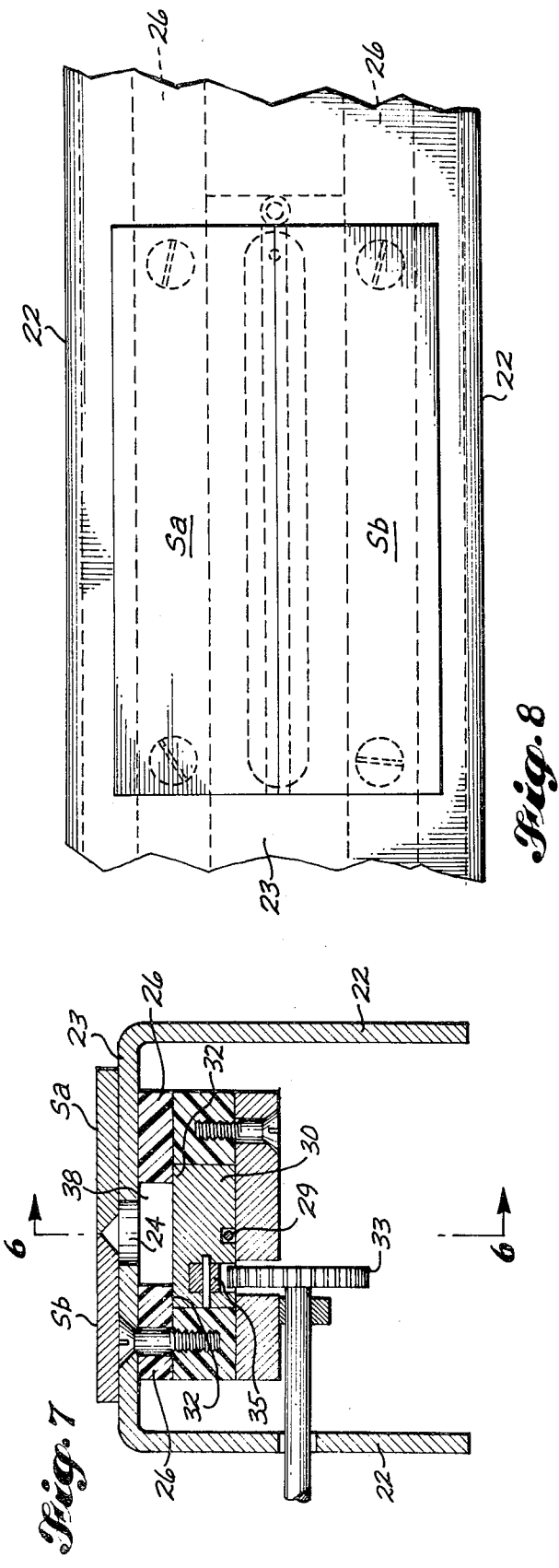

WELDING WIRE FEED MECHANISM

BACKGROUND OF THE INVENTION

1. Field of the Invention

This invention relates to welding mechanism and more particularly to mechanism for feeding welding wire to the joint location during the welding process.

2. Prior Art

Various types of construction have been proposed for feeding welding wire to the location of a weld, such as U.S. Pat. Nos. 1,644,896; 2,398,355; 3,256,418 and 3,529,127. Such devices include provision for storing welding wire, such as on spools, and dispensing the welding wire during the welding process. Devices of such general type may be used in conjunction with the mechanism of the present invention in some instances.

SUMMARY OF THE INVENTION

A principal object of the present invention is to facilitate feeding welding wire reliably close to the location at which a weld is being formed at a speed commensurate with the requirements of the weld. In thus feeding welding wire, it is an object to be able to feed welding wire of different sizes and at varying speeds, depending upon the requirements of the weld.

Another object is to be able to feed welding wire to a weld location either manually or by use of power.

In accompanying the foregoing objects, it is an object to utilize mechanism which is simple and rugged and which is very compact.

Another object is to utilize welding wire feeding mechanism according to the present invention in a machine for effecting the welding operation by an electric arc utilizing the welding wire as an electrode.

The objects recited above can be accomplished by providing apparatus for holding workpieces stationary and moving a wire feeder along a joint location at a speed corresponding to the speed at which the weld is to be formed between the workpieces.

BRIEF DESCRIPTION OF THE DRAWINGS

FIGS. 3 and 4 are transverse sections taken on line 3—3 of FIG. 2, showing parts in different operative positions.

FIG. 5 is a longitudinal section through welding apparatus similar to that shown in FIG. 2, but of somewhat modified construction.

FIG. 6 is a longitudinal section through a different type of welding apparatus, utilizing the present invention, taken along line 6—6 of FIG. 7.

FIG. 7 is a transverse section through such apparatus, taken along line 7—7 of FIG. 6.

FIG. 8 is a fragmentary plan of the apparatus viewed from line 8—8 of FIG. 6.

FIG. 9 is a longitudinal section through the apparatus, similar to FIG. 6, but showing parts in different operative positions.

DETAILED DESCRIPTION

Figure 1:
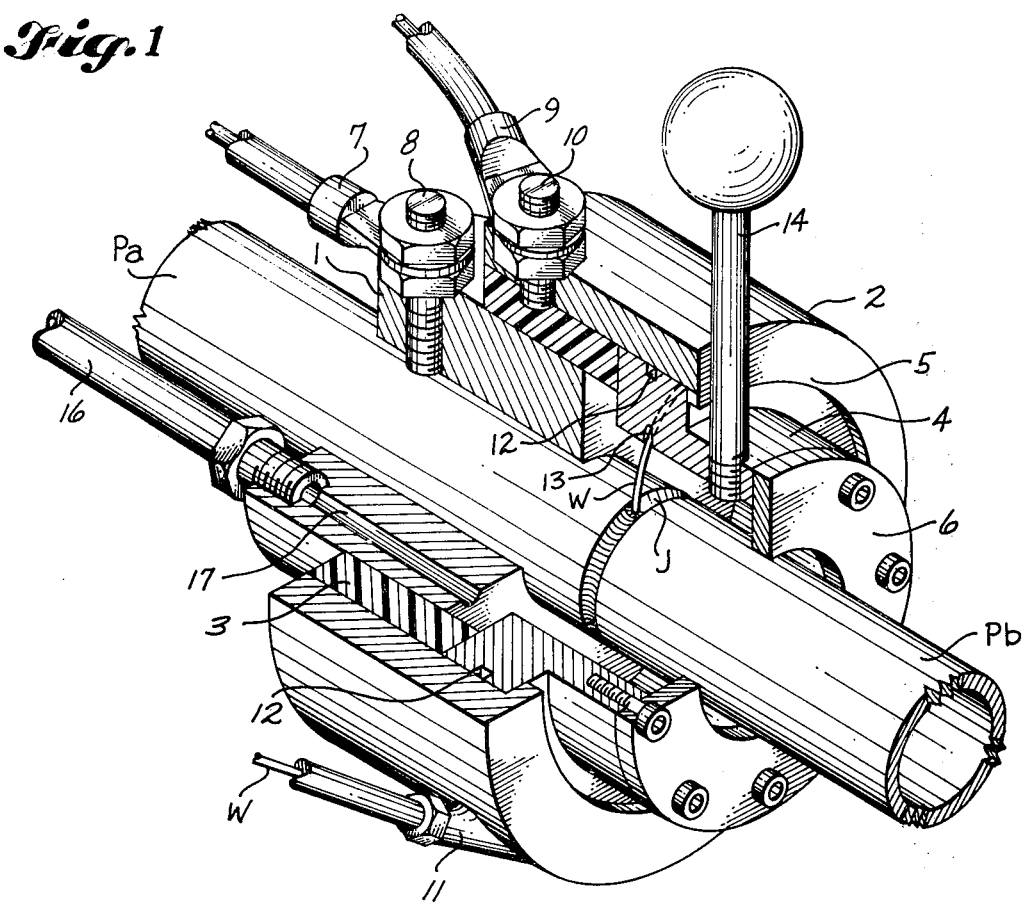
FIG. 1 is a top perspective of welding mechanism in accordance with the present invention, parts being broken away.

Apparatus utilizing the present invention can be constructed to feed welding wire to different types of joints and to joints between workpieces of different types. For purposes of illustration, apparatus is shown in the drawings for supplying welding wire to the groove of a single vee butt joint, which in one instance is formed between abutting pipe ends and in another instance is formed between the edges of flat plates. The invention may, however, be adapted for feeding welding wire to other types of joints and/or to joints between other types of elements to be connected by a welded joint.

Figure 2:
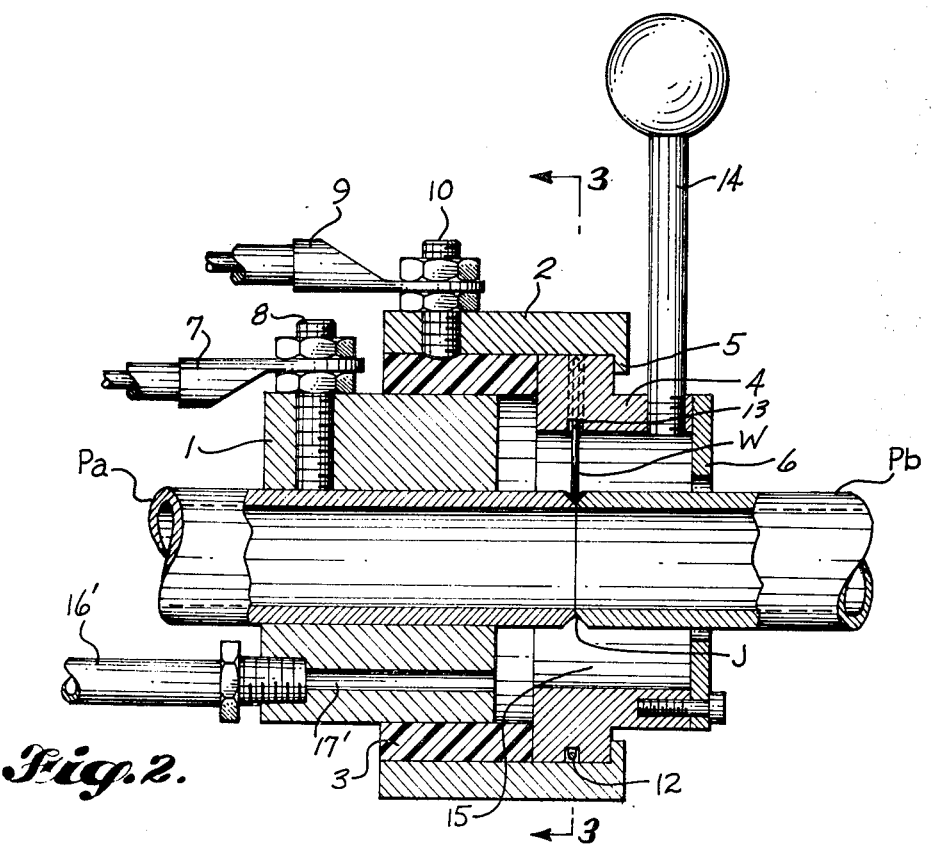
FIG. 2 is a longitudinal section through a slightly modified form of the invention.

FIGS. 1 to 5, inclusive, show welding apparatus for forming a single vee butt joint between abutting ends of pipe sections Pa and Pb. The end portion of one of the pipe sections Pa to be welded is inserted through a sleeve 1 until its end to be welded projects a substantial distance beyond such sleeve, as shown in FIGS. 1 and 2. A stationary ring or supply member 2 encircles a portion of the sleeve 1 and the portion of the pipe Pa projecting beyond it. Such ring is mounted on the sleeve 1 by a collar 3 of insulating material, so as to electrically insulate the sleeve 1 and ring 2 from each other.

The welding wire W is fed to the joint J between the abutting ends of the pipe sections Pa and Pb by a feeder rotor 4 received within the ring 2 in tandem with the collar 3, as shown in FIGS. 1 and 2. Collar 3 projects beyond the adjacent end of sleeve 1 to space rotor 4 axially from the sleeve ring 2 serving as an encircling bearing ring for rotor 4. The rotor is held in such position by a flange 5 projecting inwardly from the end of the ring 2 into a position overlapping the outer margin of the rotor 4. The end of the rotor remote from collar 3 can be partially closed by an annular plate 6, leaving clearance for passage of pipe Pb through its aperture.

The apparatus shown in FIGS. 1 to 5, inclusive, is suitable for use in an electric arc type of welder where one electrode is effectively connected to the work to be welded and the welding wire constitutes the other electrode. For such apparatus the sleeve 1 is made of metal and is connected to one terminal of a welding current supply by a wire 7 connected by bolt 8 to the sleeve. Such bolt may extend radially through the sleeve and have its inner end in contact with the workpiece Pa, as shown in FIGS. 1 and 2. Such bolt may also serve as a set screw to hold the sleeve 1 securely on the pipe workpiece Pa.

The other connection to the source of welding current is effected by the wire 9, connected to the bolt 10, which is screwed into the metal ring 2. This ring is in electrical sliding contact with the metal welding wire feeder rotor 4, which in turn is in adequate electrical contact with the welding wire W. As stated previously, the ring 2 and the sleeve 1 are electrically isolated from each other by the collar 3 of insulating material.

The welding wire W is supplied from any suitable source of supply exteriorly of the stationary ring 2 to a stationary welding wire supply connection 11 on the stationary ring 2. Such supply connection passage leads to a passage extending through the wall of the ring in a direction substantially tangential to the inner periphery of such ring, as shown in FIGS. 3 and 4.

The welding wire feeder rotor 4 has an external circumferential groove 12 located in registration axially of the rotor with the passage through the welding wire supply connection 11. An arcuate welding wire feed passage 13 extends from the groove 12 through the wall of the rotor 4, as shown in FIGS. 2, 3 and 4. The inner end portion of such feed passage is directed substantially radially inward toward the joint location J of the weld between the pipe section workpieces Pa and Pb.

To effect rotation of the feeder rotor 4 relative to the sleeve 1 and ring 2, a handle 14 can be provided, extending substantially radially outward from the rotor. Collar 3 and ring 2, including the ring flange 5, guide the rotor for movement of its feed passage 13 progressively along the joint location as the rotor is rotated. During welding the space 15 within the rotor 4 and encircling the weld location J can be supplied with inert gas from a pipe 16 connected to a duct 17 extending axially through the sleeve 1, as shown in FIG. 1. Such pipe and duct are shown as being spaced circumferentially of the sleeve approximately ninety degrees from the bolt 8 in FIG. 1, but instead such gas can be supplied through a pipe 16' and duct 17', as shown in FIG. 2, which are spaced circumferentially of sleeve 1 approximately 180° from bolt 8. Escape of inert gas supplied to the joint location is deterred because such location is substantially enclosed by sleeve 1, collar 3, ring 2, rotor 4 and plate 6.

Before beginning a welding operation at the joint location J, the ring 2 and the welding wire feeder rotor 4 should be disposed substantially in the relative positions of FIG. 3 with welding wire W extending throughout the circumference of the peripheral groove 12 in the rotor 4 and through the wire feed passage 13 extending through the rotor wall, as shown in FIG. 3. To place the apparatus in this condition welding wire can be laid in the groove 12 most easily by starting the welding wire from the supply connection 11 directly through the feed passage 13 in the position of FIG. 3, and then turning the rotor 4 in the clockwise direction through a complete revolution back to the position shown in FIG. 3. During such rotation the bent end portion of the wire W extending through the feed passage 13 would not move with respect to such passage, so that welding wire will be drawn through the supply connection 11 at the same speed that the rotor 4 is turned relative to the ring 2 and will simply be laid in the circumferential groove 12.

In order to form a weld in the vee of the joint location J, welding current is supplied to the connections 7 and 9 and a force is applied to the handle 14 to turn the rotor 4 in a counterclockwise direction relative to the stationary ring 2 and workpieces Pa and Pb, as indicated by the arrow in FIG. 4. With the end of the welding wire W in the vee of the joint location J, energization of the wires 7 and 9 from the source of welding current will cause an arc to be struck between the welding wire and the work, so as to heat the welding wire sufficiently to melt weld metal from its end and deposit it in the vee. The arc can be continued to accomplish the welding operation as metal is melted from the welding wire end by rotating the rotor 4 in the counterclockwise direction, as indicated by the arrow in FIG. 4, relative to the ring 2 and workpieces at a speed such that sufficient welding wire is discharged continuously from feed passage 13 as it moves circumferentially around the pipes Pa and Pb at the speed that the weld is being formed at the joint location J.

During such rotation wire is discharged through the passage 13 from the rotor groove 12 by the unwinding rotation of the rotor 4 turning the rotor feed passage 13 toward the wire supply connection 11. If there is sufficient welding wire W stored in groove 12 of the feeder rotor to form the weld, the wire is simply suitably held against movement outward through supply connection 11, such as by being clamped with a set screw. In some cases it will be necessary to supply additional welding wire continuously through the connection 11 to the rotor 4 as it is turned during the welding operation in order to fill the vee. Such additional wire feed can be accomplished progressively at a controlled rate by mechanism such as shown in U.S. Pat. Nos. 1,644,896; 2,398,355; 3,256,418; 3,509,314 or 3,529,127, for example.

The thickness of the walls of pipes Pa and Pb may be different in pipes of the same inner diameter. The angle and depth of the vee may be different for different joints. The size of wire W may be different in different operations. In some instances it may be desired to fill the vee of the welded joint completely in a single circumferential pass, whereas in other instances it may be preferred to complete the weld in two or more successive circumferential passes all in the same direction or, alternatively, turning the rotor 4 in one direction for one pass and in the opposite direction for the next pass so that the wire passage 13 does not pass beyond the supply connection when the rotor is turning clockwise as indicated in FIG. 4. Such variables can be coordinated so as to provide a satisfactory weld by regulating the speed at which the rotor 4 is turned relative to the ring 2 and either by clamping the weld wire W against movement relative to the supply connection 11 during the welding operation, or by supplying additional welding wire through the connection 11 at a predetermined rate of speed during the welding operation.

Standard sizes of welding wire are 0.03, 0.035, 0.045 and 0.062 of an inch [0.762, 0.889, 1.143 and 1.575 mm.] in diameter. If the inner diameter of the pipes Pa and Pb is three-quarters of an inch, the pipes are thin-wall tubing, and there is little or no vee, a butt weld can be formed by applying an external bead using welding wire 0.035 of an inch [0.889 mm.] in diameter. The circumferential length of the weld would be three and one-third inches [8.46 cm.], and the length of groove 12 containing welding wire would be approximately five and one-half inches [13.97 cm.]. In that case, therefore, five and one-half inches [13.97 cm.] of welding wire would be fed during one revolution of the feeder rotor 4 to a joint location J three and one-third inches [8.46 cm.] in length, without additional wire being supplied through the connection 11 during the welding operation.

In other instances either the groove 12 could be of the helical type having a length of more than one turn, such as two or three turns, and the weld could be made in a corresponding number of passes of the feeder rotor around the pipe. Alternatively additional welding wire could be fed into the connection 11 at a predetermined speed during the welding operation. In the latter case welding wire W not only would be moving out of the peripheral groove 12 into the wire feed passage 13, but at the same time welding wire would also be fed into the groove 12 from the connection 11 but at a slower speed.

Instead of manually rotating the rotor 4 relative to the ring 2 and the workpieces by applying force to handle 14, power means can be provided for rotating the rotor, as shown in FIG. 5. In this instance the rotor is rotated by a pinion 18 driven by a gear train 19 powered by a motor 20 mounted on the ring 2. The pinion 18 meshes with a ring gear 21 formed on the periphery of the annular cover plate 6' mounted on the end of the rotor 4 remote from collar 3. Preferably motor 20 is of the variable-speed type, so that its speed can be regulated to drive the rotor 4 at the speed at which it is desired that the weld be formed at the joint location J. Except for the power drive of the rotor 4, the operation of the apparatus shown in FIG. 5 is the same as that described in connection with the apparatus of FIGS. 1 to 4, inclusive.

The same welding wire feed principle can be utilized in forming a linear joint between the edges of two plates or sheets Sa and Sb, as shown in FIGS. 6 to 9, inclusive. In this apparatus the frame is of channel shape including spaced upright sides or flanges forming supports 22 connected by a web forming a top 23 on which the work plates or sheets are mounted. In this case also the workpieces are to be joined by a single vee butt joint type of weld. The joint location of the linear weld is inverted over a slot 24 in the top 23 of the welding apparatus.

The welding wire feeding mechanism is supported by a stationary base plate 25 suspended from the top 23 of the apparatus by insulating structure 26 attached by separate bolts to such top and such base plate. Welding wire is supplied to the feeder mechanism through a stationary connection 27 carried by the base plate 25 and through a supply passage 28 in such plate to a groove 29 in the bottom of a reciprocating feeder slide 30. A curved welding wire feed passage 31 extends through the feeder slide 30 from the groove 29 to a discharge opening substantially perpendicular to the upper side of the slide and located in alignment with the joint location J between the workpieces to be welded.

The opposite edges of feeder slide 30 are received in opposite grooves 32 opening toward each other to guide the slide for reciprocation lengthwise of the joint to be welded. Reciprocation of the slide can be effected by rotation of a drive pinion 33 carried by axle 34 mounted on the base plate 25 and meshing with a rack 35 mounted in a downwardly-opening groove in the bottom of the slide. The drive pinion 33 can be rotated by turning shaft 34 manually or by a power drive attached to such shaft.

The apparatus of FIGS. 6 to 9 can be utilized in an electric arc type of welding operation by attaching to the frame 22,23 a wire 36 connected to one terminal of a source of welding current and by connecting to the base plate 25 another wire 37 connected to such source of welding current. The frame 22,23 and the base plate 25 are electrically isolated by the interposed insulating material 26. The frame top 23 is in electrically-conducting relationship to the workpieces Sa and Sb. The base plate 25 is in electrically-conducting relationship to the welding wire as such wire moves through the passage 28 in the base plate.

During the welding operation inert gas can be supplied from a supply pipe 39 through a passage 40 at the end of slide 30 to the space 38 separating the welding wire feeder slide 30 and the frame top 23. The gas can escape from chamber 38 past the left end of slide 30 as seen in FIG. 6.

The operation of the apparatus shown in FIGS. 6 to 9, inclusive, is similar to that described in connection with FIGS. 1 to 5. Weld wire is supplied from the supply connection 27 to fill the passage 28, groove 29 and feed passage 31. Welding current supplied through wires 36 and 37 will strike an arc between the welding wire W projecting beyond passage 31 and the workpieces Sa and Sb at one end of the joint location J, as shown in FIG. 6. As the welding progresses from right to left along the joint, such as from the condition of FIG. 6 to that of FIG. 9, the pinion 33 will be turned in a counterclockwise direction to move the slide 30 progressively to the left, as indicated by the arrow in FIG. 9, in synchronism with formation of the weld. During such movement of the slide welding wire feed passage 31 to the left toward the welding wire supply connection 27, either the welding wire W will be sufficiently large to supply enough welding material from welding wire in the groove 29 to complete the weld in a single pass lengthwise of the joint, or a sufficient supply of welding wire can be fed progressively during the welding operation through the supply connection 27 to provide sufficient weld material, or the weld can be completed by making a plurality of passes of the welding wire supply passage 31 along the weld by repeated reciprocation of slide 30, either successively in the same direction or alternatively first in one direction and then in the opposite direction. In the latter instance it would be necessary to supply additional welding wire through the supply connection 27 during movement of the slide 30 from left to right as seen in FIG. 6.

I claim:

1. Welding mechanism comprising:
   work-holding means for holding two workpieces in stationary relationship forming an elongated joint location;
   welding wire feed means including a welding wire feeder member movable relative to said work-holding means and welding wire supply means stationary relative to said work-holding means, said feeder member and said welding wire supply means being in adjacent relationship and cooperatively forming a welding wire-receiving groove therebetween, said feeder member having a welding wire feed passage directed toward said joint location at one end and directed toward said welding wire-receiving groove at the other end;
   means guiding said welding wire feeder member for movemengt of said welding wire feed passage progressively alon the length of said joint location; and
   means for melting at said joint location welding wire supplied to said joint location through said welding wire feed passage as said welding wire feed passage is moved relative to said work-holding means.

2. The welding mechanism defined in claim 1, in which the joint location is annularly curved, and the guiding means guides the welding wire feeder member for rotation of the welding wire feed passage relative to the work-holding means.

3. The welding mechanism defined in claim 1, in which the joint location is linear, and the guiding means guides the welding wire feeder member for linear movement of the welding wire feed passage relative to the work-holding means.

4. The welding mechanism defined in claim 1, in which the work-holding means is electrically isolated from the welding wire feed means, and means for conducting electricity to the work-holding means and to the welding wire feeder member for striking an arc between welding wire discharged from the welding wire feed passage and the workpieces at the joint location.

5. The welding mechanism defined in claim 1, in which the welding wire supply means has a welding wire supply passage extending from the exterior of such means to the welding wire-receiving groove.

6. Welding mechanism comprising:
   work-holding means for holding two workpieces in stationary relationship forming an annularly curved elongated joint location;
   welding wire feed means including a generally annular rotor encircling said joint location and stationary welding wire supply means encircling said rotor, said rotor and said welding wire supply means forming a welding wire-receiving groove therebetween, said rotor being movable relative to said work-holding means and having a welding wire feed passage directed toward said joint location at one end and directed toward said welding wire-receiving groove at the other end;

means guiding said rotor for rotation to move said welding wire feed passage progressively along the length of said joint location; and means for melting at said joint location welding wire supplied to said joint location through said welding wire feed passage as said welding wire feed passage is moved relative to said work-holding means.

7. The welding mechanism defined in claim 6, and a handle projecting outward from the rotor away from the workpieces for rotating the rotor to move the welding wire feed passage along the joint location.

8. The welding mechanism defined in claim 6, in which the work-holding means is electrically isolated from the welding wire feed means, and means for conducting electricity to the work-holding means and to the welding wire feed means for striking an arc between the welding wire discharged from the welding wire feed passage and the workpieces at the joint location.

9. The welding mechanism defined in claim 6, in which the stationary welding wire supply means has a welding wire supply passage extending from the exterior of such supply means to the welding wire-receiving groove.

10. The welding mechanism defined in claim 6, means for supplying inert gas to the joint location, and means for substantially enclosing the joint location between the two workpieces for deterring escape of inert gas supplied to the joint location by said inert gas-supplying means.

11. Welding mechanism comprising stationary work-holding means for holding two workpieces in stationary relationship forming an elongated joint location, stationary welding wire supply means having a welding wire supply passage extending to the exterior of said supply means so that welding wire can be supplied to said stationary welding wire supply passage from the exterior of the welding mechanism, welding wire feed means movable relative to said stationary work-holding means and having a welding wire feed passage located adjacent to and directed toward such joint location for feeding welding wire from said stationary welding wire supply means passage to such joint location resulting from movement of said welding wire feed means relative to said stationary welding wire supply means, means for supplying welding wire to said stationary welding wire supply means welding wire supply passage from the exterior of said stationary welding wire supply means while said welding wire feed means is moving relative to said stationary work-holding means but at a rate not controlled by the movement of said welding wire feed means relative to said stationary work-holding means, and means guiding said welding wire feed means for movement of said welding wire feed passage progressively along the length of said joint location.

12. Welding mechanism comprising:

work-holding means for holding two workpieces in stationary relationship forming an annularly curved elongated joint location;

welding wire feed means including a generally annular rotor encircling said joint location, rotatable relative to said work-holding means and having a welding wire feed passage directed toward the joint location for feeding welding wire therethrough to such joint location as said rotor rotates; and stationary bearing ring means of substantially uniform external circumferential extent throughout its axial length, closely encircling said rotor and encircling said welding wire feed passage, guiding said rotor for rotation to move said welding wire feed passage progressively along the length of said joint location, and said stationary bearing ring means having a passage therethrough for receiving welding wire from the exterior of said stationary bearing ring means for passage therethrough to said rotor welding wire feed passage.

* * * * *

UNITED STATES PATENT AND TRADEMARK OFFICE
CERTIFICATE OF CORRECTION

PATENT NO. : 4,143,257
DATED : March 6, 1979
INVENTOR(S) : Karl Heinz Friedrich Wilhelm Herrmann It is certified that error appears in the above-identified patent and that said Letters Patent are hereby corrected as shown below:

Title page, [56] References Cited, cancel "Thompson" and insert --Thomson--; after "Ogden" insert --et al--; after "Urbanic" insert --et al.--.

Column 6, line 35, cancel "movemengt" and insert --movement--; line 36, cancel "alon" and insert --along--.

Signed and Sealed this

Tenth Day of July 1979

[SEAL]

Attest:

*Attesting Officer*

LUTRELLE F. PARKER
*Acting Commissioner of Patents and Trademarks*